US009794560B2

(12) United States Patent
Srinivasan

(10) Patent No.: US 9,794,560 B2
(45) Date of Patent: *Oct. 17, 2017

(54) METHOD AND SYSTEM FOR VIDEO PICTURE INTRA-PREDICTION ESTIMATION

(71) Applicant: Texas Instruments Incorporated, Dallas, TX (US)

(72) Inventor: Ranga Ramanujam Srinivasan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/043,973

(22) Filed: Feb. 15, 2016

(65) Prior Publication Data

US 2016/0165232 A1 Jun. 9, 2016

Related U.S. Application Data

(63) Continuation of application No. 13/936,249, filed on Jul. 8, 2013, now Pat. No. 9,264,710.
(Continued)

(51) Int. Cl.
H04N 7/12 (2006.01)
G06F 17/30 (2006.01)
(Continued)

(52) U.S. Cl.
CPC .......... *H04N 19/11* (2014.11); *H04N 19/119* (2014.11); *H04N 19/136* (2014.11);
(Continued)

(58) Field of Classification Search
CPC .......... H04N 19/00763; H04N 19/147; H04N 19/157; H04N 19/174
See application file for complete search history.

(56) References Cited

U.S. PATENT DOCUMENTS 7,822,116 B2 10/2010 Hinds
2012/0057631 A1 3/2012 Le Leannec
(Continued)

OTHER PUBLICATIONS

Prosecution History for U.S. Appl. No. 13/936,249 from Jul. 8, 2013 to Jan. 28, 2016 (123 pages).

*Primary Examiner* — Tsion B Owens
(74) *Attorney, Agent, or Firm* — Gregory J. Albin; Charles A. Brill; Frank D. Cimino

(57) ABSTRACT

Several systems and methods for intra-prediction estimation of video pictures are disclosed. In an embodiment, the method includes accessing four 'N×N' pixel blocks comprising luma-related pixels. The four 'N×N' pixel blocks collectively configure a '2N×2N' pixel block. A first predetermined number of candidate luma intra-prediction modes is accessed for each of the four 'N×N' pixel blocks. A presence of one or more luma intra-prediction modes that are common among the candidate luma intra-prediction modes of at least two of the four 'N×N' pixel blocks is identified. The method further includes performing, based on the identification, one of (1) selecting a principal luma intra-prediction mode for the '2N×2N' pixel block and (2) limiting a partitioning size to a 'N×N' pixel block size for a portion of the video picture corresponding to the '2N×2N' pixel block.

18 Claims, 7 Drawing Sheets

Related U.S. Application Data

(60) Provisional application No. 61/668,748, filed on Jul. 6, 2012.

(51) Int. Cl.

| | | |
|---|---|---|
| *H04N 19/11* | (2014.01) | |
| *H04N 19/119* | (2014.01) | |
| *H04N 19/147* | (2014.01) | |
| *H04N 19/157* | (2014.01) | |
| *H04N 19/174* | (2014.01) | |
| *H04N 19/33* | (2014.01) | |
| *H04N 19/593* | (2014.01) | |
| *H04N 19/136* | (2014.01) | |
| *H04N 19/176* | (2014.01) | |
| *H04N 19/61* | (2014.01) | |

(52) U.S. Cl.
CPC ......... *H04N 19/147* (2014.11); *H04N 19/157* (2014.11); *H04N 19/174* (2014.11); *H04N 19/176* (2014.11); *H04N 19/33* (2014.11); *H04N 19/593* (2014.11); *H04N 19/61* (2014.11)

(56) References Cited

U.S. PATENT DOCUMENTS

| | | |
|---|---|---|
| 2012/0314766 A1 | 12/2012 | Chien et al. |
| 2013/0177079 A1 | 7/2013 | Kim et al. |
| 2014/0072053 A1 | 3/2014 | Zheludkov et al. |

METHOD AND SYSTEM FOR VIDEO PICTURE INTRA-PREDICTION ESTIMATION

This application is a continuation of U.S. patent application Ser. No. 13/936,249 filed Jul. 8, 2013, which claims the benefit of U.S. Provisional Application No. 61/668,748, filed Jul. 6, 2012, the entire contents of both being incorporated by reference herein.

TECHNICAL FIELD

The present disclosure generally relates to the field of intra-prediction estimation in video pictures.

BACKGROUND

Technological advancements over time have enabled video pictures to be captured at higher resolutions along with a corresponding increase in video data picture size. Accordingly, video pictures may be compressed (e.g. encoded) by exploiting spatial and/or temporal redundancies therein in order to efficiently utilize a storage space or efficiently utilize bandwidth during a transmission. The compression of video pictures, typically, includes predicting blocks of pixels corresponding to a video picture from other pixel blocks within the same video picture (e.g. intra-prediction) or from pixel blocks from one or more reference video pictures (e.g. inter-prediction). Video coding standards, such as, for example, high efficiency video coding (HEVC) suggest a number of intra-prediction modes for facilitating intra-prediction, where each intra-prediction mode corresponds to a direction of prediction. As a result of variable prediction unit size and quad-tree complexity, selecting an intra-prediction mode for a pixel block from among the suggested intra-prediction modes is computationally intensive, thereby leading to increased resource and power utilization.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

Various systems, methods, and computer-readable mediums configured for video picture intra-prediction estimation are disclosed. In an embodiment, the method includes accessing four 'N×N' pixel blocks by an intra-prediction estimation device. In an embodiment, the four 'N×N' pixel blocks comprise luma-related pixels, and the four 'N×N' pixel blocks collectively configure a '2N×2N' pixel block of a video picture. In an embodiment, 'N' is an integer value with value from one among 8, 16 and 32. The method further includes accessing a first pre-determined number of candidate luma intra-prediction modes for each of the four 'N×N' pixel blocks by the intra-prediction estimation device. In an embodiment, a candidacy of the luma intra-prediction modes is determined based on a predefined measure. In an embodiment, the predefined measure is one of a sum of absolute differences (SAD) cost and a sum of absolute transform differences (SATD) cost. The method further includes identifying, with the intra-prediction estimation device, a presence of one or more luma intra-prediction modes that are common among the candidate luma intra-prediction modes of at least two of the four 'N×N' pixel blocks. The method also includes performing, by the intra-prediction estimation device, one of (1) selecting a principal luma intra-prediction mode for the '2N×2N' pixel block from among the one or more luma intra-prediction modes based on identifying the presence of the one or more luma intra-prediction modes that are common among the candidate luma intra-prediction modes of at least two of the four 'N×N' pixel blocks, and (2) limiting a partitioning size to a 'N×N' pixel block size for a portion of the video picture corresponding to the '2N×2N' pixel block subsequent to identifying an absence of the one or more luma intra-prediction modes that are common among the candidate luma intra-prediction modes of at least two of the four 'N×N' pixel blocks.

In an embodiment, if a presence of a luma intra-prediction mode from among the one or more luma intra-prediction modes that is common to each of the four 'N×N' pixel blocks is identified, then the luma intra-prediction mode is selected as the principal luma intra-prediction mode for the '2N×2N' pixel block. In an embodiment, that are common among the candidate luma intra-prediction modes of two or three 'N×N' pixel blocks from among the four 'N×N' pixel blocks is identified, then the intra-prediction estimation device is configured to (1) associate the one or more luma intra-prediction modes with the remaining pixel blocks from among the four 'N×N' pixel blocks (2) compute RDO cost for each of one or more luma intra-prediction modes for each of the remaining pixel blocks, and (3) select a luma intra-prediction mode from among the one or more luma intra-prediction modes as the principal luma intra-prediction mode for the '2N×2N' pixel block based on the RDO cost associated with each of the one or more luma intra-prediction modes.

In an embodiment, the method further includes accessing four pixel blocks comprising chroma-related pixels by the intra-prediction estimation device. The four pixel blocks collectively configure a chroma pixel block corresponding to the '2N×2N' pixel block. The method further includes accessing a second pre-determined number of candidate chroma intra-prediction modes for each of the four pixel blocks by the intra-prediction estimation device, where a candidacy of the chroma intra-prediction modes being determined based on the predefined measure. A presence of one or more chroma intra-prediction modes that are common from among the candidate chroma intra-prediction modes of at least two of the four pixel blocks is identified and a principal chroma intra-prediction mode is selected for the chroma pixel block based on identifying the presence of the one or more chroma intra-prediction modes. In an embodiment, a presence of the principal luma intra-prediction mode for the '2N×2N' pixel block from among the one or more chroma intra-prediction modes is identified by the intra-prediction estimation device, wherein the presence of principal luma intra-prediction mode is identified subsequent to identifying the presence of one or more chroma intra-prediction modes from among the candidate chroma intra-prediction modes.

Additionally, in an embodiment, a system for video picture intra-prediction estimation is provided. The system includes a memory device and an intra-prediction estimation device communicatively associated with the memory device. The memory device is configured to store one or more video pictures. The intra-prediction estimation device is configured to access four 'N×N' pixel blocks from the memory device. In an embodiment, the four 'N×N' pixel blocks comprise luma-related pixels, and the four 'N×N' pixel blocks collectively configure a '2N×2N' pixel block of a video picture from among one or more video pictures. In an embodiment, 'N' is an integer value with value from one among 8, 16 and 32. The intra-prediction estimation device is further configured to access a first pre-determined number of candidate luma intra-prediction modes for each of the four 'N×N' pixel blocks. In an embodiment, a candidacy of the luma intra-prediction modes is determined based on a predefined measure. The intra-prediction estimation device is configured to identify a presence of one or more luma intra-prediction modes that are common among the candidate luma intra-prediction modes of at least two of the four 'N×N' pixel blocks. The intra-prediction estimation device is configured to perform one of (1) selecting a principal luma intra-prediction mode for the '2N×2N' pixel block from among the one or more luma intra-prediction modes based on identifying the presence of the one or more luma intra-prediction modes that are common among the candidate luma intra-prediction modes of at least two of the four 'N×N' pixel blocks, and (2) limiting a partitioning size to a 'N×N' pixel block size for a portion of the video picture corresponding to the '2N×2N' pixel block subsequent to identifying an absence of the one or more luma intra-prediction modes that are common among the candidate luma intra-prediction modes of at least two of the four 'N×N' pixel blocks.

Moreover, in an embodiment, a non-transitory computer-readable medium storing a set of instructions that when executed cause a computer to perform a method for intra-prediction estimation of video pictures is disclosed. In an embodiment, the method includes accessing four 'N×N' pixel blocks. In an embodiment, the four 'N×N' pixel blocks comprise luma-related pixels, and the four 'N×N' pixel blocks collectively configure a '2N×2N' pixel block of a video picture. In an embodiment, 'N' is an integer value with value from one among 8, 16 and 32. The method further includes accessing a first pre-determined number of candidate luma intra-prediction modes for each of the four 'N×N' pixel blocks. In an embodiment, a candidacy of the luma intra-prediction modes is determined based on a predefined measure. In an embodiment, the predefined measure is one of a SAD cost and a SATD cost. The method further includes identifying, a presence of one or more luma intra-prediction modes that are common among the candidate luma intra-prediction modes of at least two of the four 'N×N' pixel blocks. The method also includes performing one of (1) selecting a principal luma intra-prediction mode for the '2N×2N' pixel block from among the one or more luma intra-prediction modes based on identifying the presence of the one or more luma intra-prediction modes that are common among the candidate luma intra-prediction modes of at least two of the four 'N×N' pixel blocks, and (2) limiting a partitioning size to a 'N×N' pixel block size for a portion of the video picture corresponding to the '2N×2N' pixel block subsequent to identifying an absence of the one or more luma intra-prediction modes that are common among the candidate luma intra-prediction modes of at least two of the four 'N×N' pixel blocks.

Other aspects and example embodiments are provided in the drawings and the detailed description that follows.

The drawings referred to in this description are not to be understood as being drawn to scale except if specifically noted, and such drawings are only exemplary in nature.

DETAILED DESCRIPTION

Pursuant to an example scenario, video pictures constituting video data are compressed (e.g. encoded) to efficiently utilize a storage capacity during storage or a spectrum/bandwidth during a transmission. An exemplary encoding of a video picture is explained with reference to FIG. 1.

Figure 1:
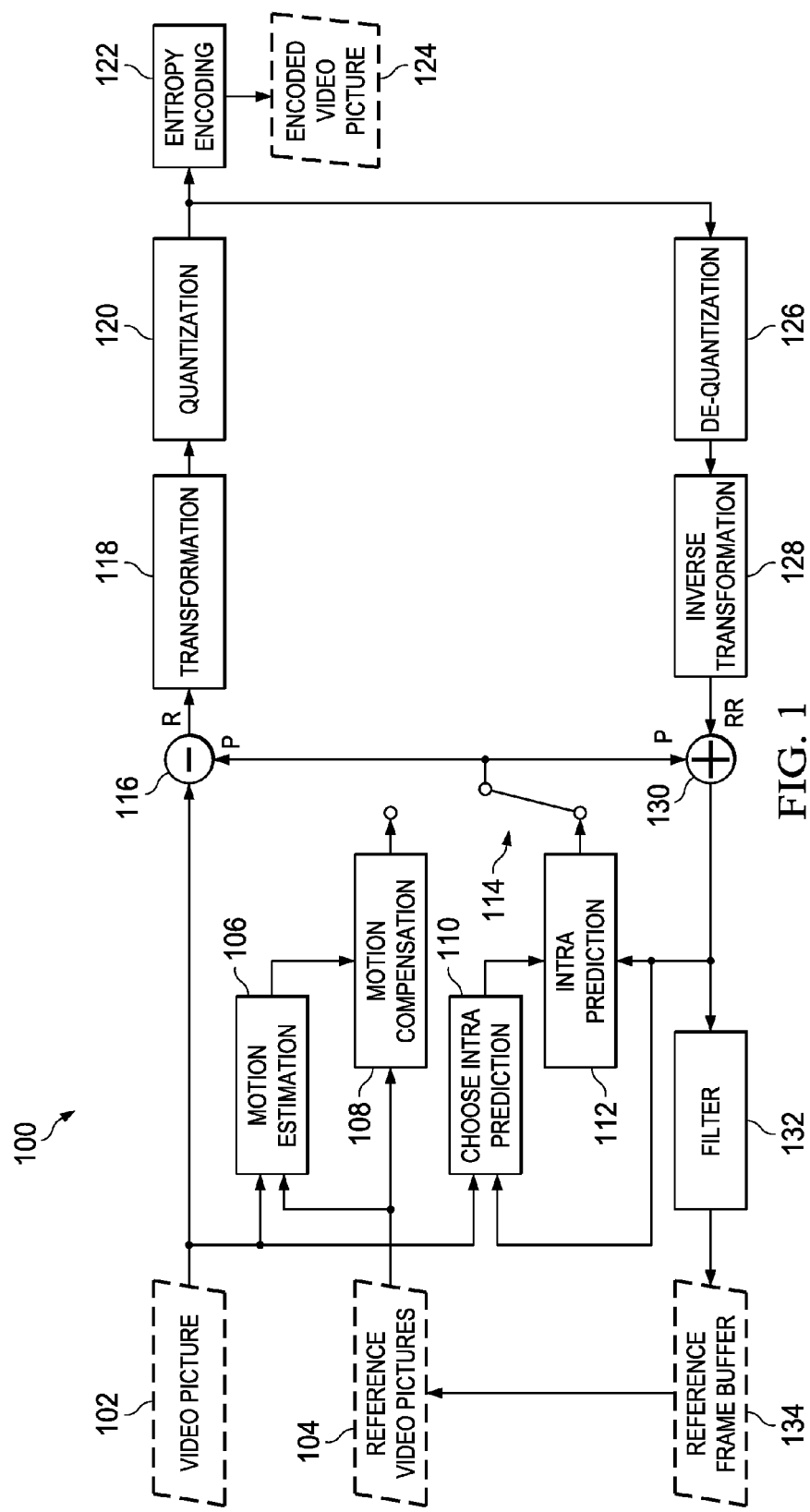
FIG. 1 illustrates a simplified overview of an exemplary process flow for encoding of video pictures in accordance with an example scenario.

FIG. 1 illustrates a simplified overview of an exemplary process flow 100 for encoding of a video picture 102 in accordance with an example scenario. Pursuant to an exemplary scenario, a video encoder may perform the process flow 100 to achieve the compression of the video picture 102. The video picture 102 may be compressed so as to efficiently utilize a storage capacity during storage or a spectrum/bandwidth during a transmission. The video encoder may be configured within a multimedia system. Examples of the multimedia system may include, but are not limited to, (1) multimedia devices, such as cellular phones, digital video cameras and digital camcorders; (2) data processing devices, such as personal computers, laptops and personal digital assistants; and (3) consumer electronics, such as set top boxes, digital video disk (DVD) players and video network servers. Pursuant to an exemplary scenario, the video encoder may be any machine capable of executing a set of instructions (sequential and/or otherwise) so as to perform an encoding of video pictures, such as the video picture 102.

Video data comprising a plurality of video pictures, such as the video picture 102, may be received by the video encoder from a media capture device. Examples of a media capture device may include a video camera or a camcorder. The media capture device may be, for example, a stand-alone device or a part of a mobile device, such as a Smartphone, or a data processing device, such as a personal computer, a laptop device or a personal digital assistant (PDA). The video picture 102 may also be received by the video encoder from a transcoding system (implemented in any of hardware, software or firmware), which may be stand-alone device or a part of media capture device.

Pursuant to an exemplary scenario, the video picture 102 is composed of several blocks of pixels (also referred to hereinafter as pixel blocks). Accordingly, the video picture 102 is processed in units of pixel blocks. It is noted that the term 'pixel blocks' as used herein may be a generalized term for the term 'largest coding units (LCU)' (or coding units) as defined in high efficiency video coding (HEVC) standard or the term 'macroblocks' according H.264/MPEG-4 advanced video coding standard. A prediction for a pixel block being processed (e.g. a current block) of the video picture 102 is performed based on previously encoded pixel blocks either from the video picture 102 itself (e.g., intra-prediction) or from pixel blocks from other video pictures that have already been encoded and transmitted (e.g., inter prediction). Identifying a suitable inter-prediction is referred to as motion estimation and subtracting the inter-prediction from the current block is referred to as motion compensation. Accordingly, the process flow 100 includes a loop for performing inter-prediction based on reference video pictures 104 and a separate loop for performing intra-prediction. The inter-prediction loop includes performing motion estimation of the current block at 106 followed by motion compensation at 108. Alternatively, the current block may be subjected to intra-prediction by choosing intra-prediction at 110 followed by performing intra-prediction at 112. The process flow 100 includes a switch 114, which performs selection of one of the loops from among those associated with inter-prediction or intra-prediction. Pursuant to an exemplary scenario, a cost (in terms of peak signal to noise ratio (PSNR) and/or bit-rate) of performing inter-prediction or intra-prediction is computed to determine the selection of the appropriate loop. In an embodiment, an availability of reference video pictures (for example, in case of I-pictures) is also be taken into account while selecting the appropriate loop from among those associated with inter-prediction or intra-prediction.

Subsequent to performing one of intra-prediction or inter-prediction estimation, a prediction 'P' corresponding to the current block is generated. The prediction 'P' is subtracted from the current block of the video picture 102 at 116 to generate a residual 'R'. The residual 'R' is subjected to transformation at 118 and quantization at 120. The transformation of the residual 'R' outputs a set of transform coefficients, each of which is a weighting value for a standard basis pattern. The weighted basis patterns, when combined, are capable of re-creating the residual 'R'. The set of transform coefficients are then quantized (such as where each coefficient is scaled corresponding to a scale-down factor which may be a mathematical reciprocal of the scale-up factor specified by a video coding standard, effectively setting a number of transform coefficients to a small value (including zero value)) to achieve compression.

The quantized transform coefficients, along with certain information (for example, information such as: information about the structure of compressed data, information about a complete sequence of video data and/or information that enables a decoder to re-create the prediction), are subject to entropy encoding (e.g., conversion into binary codes using variable length coding and/or arithmetic coding) at 122. The entropy encoding of pixel blocks, such as the current block, corresponding to the video picture 102 produces an efficient, compact binary representation of the information in the form of encoded video picture 124. The encoded video picture 124 may then be stored and/or transmitted to a digital system including a decoder capable of decoding the encoded video picture 124. It is noted that the decoder may be configured to perform a decoding process flow, which generally suggests performing the inverse of the operations of process flow 100 in reverse order to decompress, e.g., decode, a compressed video sequence. The decoding process flow is not explained herein for sake of brevity.

The process flow 100 further includes a reconstruction loop, wherein transformed and quantized residual 'R' is subjected to de-quantization (e.g., scaled corresponding to a scale-up factor which may be, in an example embodiment, a value specified by a multimedia standard) at 126 and then inverse transformation at 128 to obtain the reconstructed residual 'RR'. At 130, the reconstructed residual 'RR' data is then be added (e.g., combined) with prediction 'P' corresponding to the current block to generate reconstructed current block.

The reconstructed current block is be utilized for intra-prediction of next pixel blocks within the video picture 102. The reconstructed current block(s) is also be filtered (for example, using a deblocking filter) at 132 and stored in the reference frame buffer at 134. In an embodiment, the filtering may be performed, for example, on a pixel block-by-pixel block basis or on a picture basis. This filtering is performed to improve the reference pictures used for encoding/decoding of subsequent pictures. For example, an in-loop filter component may, for example, adaptively apply low-pass filters to block boundaries according to the boundary strength to alleviate blocking artifacts caused by the block-based video coding. The stored reconstructed pixel blocks, such as the reconstructed current block, constituting an entire video picture are then be utilized as reference video pictures at 104 for inter-prediction of video pictures subsequent to the video picture 102 in a video data sequence.

As can be seen from the process flow 100, prediction (e.g. intra-prediction or intra-prediction) of pixel blocks drives the latter stages of the encoding process, such as transformation, quantization and entropy encoding. Accordingly, the prediction has to be performed in a fairly accurate and efficient manner. The video coding standard HEVC suggests a number of intra-prediction modes (e.g. directions of predictions) to this effect. For example, HEVC suggests 35 intra-prediction modes for facilitating a prediction of a luminance component (hereinafter referred to as luma). Determining a suitable intra-prediction mode for each pixel block by evaluating each of the 35 intra-prediction modes (for example, by performing a rate distortion optimization (RDO) cost determination for each intra-prediction mode) is computationally expensive. Accordingly, a difference measure, such as sum of absolute differences (SAD) cost or sum of absolute transform differences (SATD) cost may be computed for each of the 35 intra-prediction modes for a pixel block and a small set of intra-prediction modes may be identified from among the 35 intra-prediction modes based on minimization of SAD/SATD cost. A RDO computation may be performed for only this small set of intra-prediction modes to identify the principal luma intra-prediction mode for the pixel block. Performing the intra-prediction estimation in such a manner, though reducing a number of computations, does not suggest re-using block computations for subsequent blocks. Further, on account of variable block size and quad tree complexity in HEVC standard, the intra-prediction estimation is still computationally intensive. Various embodiments of the present technology, however, provide methods, systems, and computer-readable mediums for performing video picture intra-prediction estimation that are capable of overcoming these and other obstacles and providing additional benefits. A system configured to perform intra-prediction estimation is described herein with reference to FIG. 2.

Figure 2:
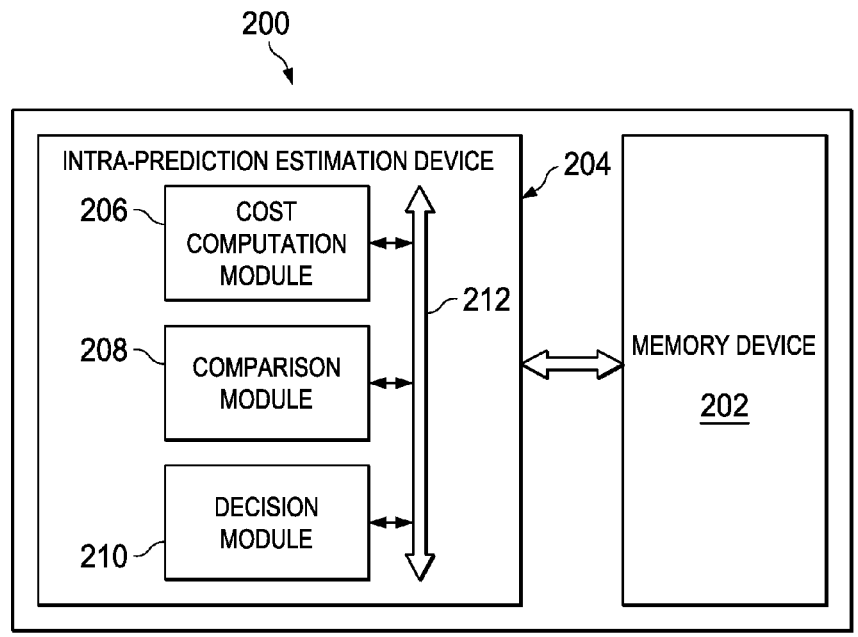
FIG. 2 is a simplified block diagram of an exemplary system configured for video picture intra-prediction estimation in accordance with an embodiment.

FIG. 2 is a simplified block diagram of an example system 200 configured for performing video picture intra-prediction estimation in accordance with an embodiment. In an embodiment, the system 200 may be included within a video processing device with or without the capability of video playback. Examples of the video processing device include, but are not limited to: (1) multimedia device, such as, for example, a cellular phone, a digital video camera and a digital camcorder; (2) data processing device, such as, for example, a personal computer (PC), a laptop, a tablet PC, and a personal digital assistants; and (3) consumer electronics, such as, for example, a set top box, a digital video disk (DVD) player and a video network server. In another embodiment, the system 200 may be configured to be included within a video encoder/decoder (hereinafter referred to as a video codec). Pursuant to an example scenario, the video codec may be any machine capable of executing a set of instructions (sequential and/or otherwise) so as to perform an encoding and decoding of video data. For example, the system 200 may be included within a video codec configured to execute the process flow 100 of FIG. 1. In an embodiment, the video codec may be configured within a video processing device. Alternatively, in an embodiment, the system 200 may be communicatively associated with or coupled to a video codec such that intra-prediction estimation of pixel blocks corresponding to the video picture may be performed and the corresponding output may be provided to the video codec. In an embodiment, the system 200 may be configured within a video content analysis (VCA) system.

In FIG. 2, the system 200 is depicted to include a memory device 202 and an intra-prediction estimation device 204. The intra-prediction estimation device 204 is hereinafter referred to as IPE device 204. The IPE device 204 may be included within the 'intra-prediction' component 112 in the process flow 100 of FIG. 1. The memory device 202 is configured to store one or more video pictures, such as the video picture 102 depicted in process flow 100 of FIG. 1. In cases where the system 200 is included within a video codec, the memory device 202 may refer to an internal buffer (temporary or otherwise) which is communicably associated with an internal storage associated with a video processing device housing the video codec. Examples of the memory device 202 include, but are not limited to, a random access memory (RAM), a synchronous dynamic RAM (SDRAM), a double data rate SDRAM (DDR SDRAM), and the like. It is noted that the system 200 may include a plurality of components configured to facilitate various functions of encoding/decoding of video pictures and which are not depicted herein in FIG. 2 for sake of brevity. The memory device 202 and the IPE device 204 are communicatively associated with each other as depicted in FIG. 2. The communication between the memory device 202 and the IPE device 204 may be facilitated by various means, such as data bus, control bus and the like. The bus may be, for example, a serial bus, a unidirectional bus or a bi-directional bus.

The IPE device 204 includes a cost computation module 206, a comparison module 208 and a decision module 210. The various modules of the IPE device 204, such as the cost computation module 206, the comparison module 208 and the decision module 210 are communicably associated with each other via bus 212. Examples of the bus 212 include, but are not limited to, a data bus, an address bus, a control bus, and the like. The bus 212 may be, for example, a serial bus, a bi-directional bus or a unidirectional bus. Further, the various modules of the IPE device 204, such as the cost computation module 206, the comparison module 208 and the decision module 210 may be implemented as hardware, software, firmware or any combination thereof.

In an embodiment, the IPE device 204 may be embodied as a multi-core processor, a single-core processor, or a combination of one or more multi-core processors and one or more single-core processors. For example, the IPE device 204 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the IPE device 204 may be configured to execute hard-coded functionality. In an embodiment, the IPE device 204 may be embodied as an executor of software instructions, wherein the instructions may specifically configure the IPE device 204 to perform the algorithms and/or operations described herein when the instructions are executed. The IPE device 204 may include, among other things, a clock, an arithmetic logic unit (ALU) and logic gates configured to support an operation of the IPE device 204. In an embodiment, the IPE device 204 may be an advanced reduced instruction set computer (RISC) machine (ARM) processor.

In an embodiment, the cost computation module 206 is configured to compute one or more costs associated with pixel blocks of a video picture, such as the video picture 102 of FIG. 1. In an embodiment, the cost computation module 206 is configured to compute a SAD cost for pixel blocks associated with the video picture. A SAD cost refers to a sum value of absolute differences in pixel values between a pixel block and a corresponding predicted pixel block. Accordingly, a higher SAD cost may imply a higher amount of difference between the pixel block and the corresponding predicted pixel block (e.g. a larger residual) thereby requiring higher number of bits for encoding the pixel block. In an embodiment, the cost computation module 206 is configured to compute a SATD cost for the pixel blocks associated with the video picture. A SATD cost refers to a sum value of absolute transform differences between a pixel block and a corresponding predicted pixel block.

In an embodiment, the cost computation module 206 is also configured to compute RDO cost for pixel blocks associated with the video picture. In video coding standards such as the HEVC, multiple intra-prediction modes are suggested for intra-prediction of pixel blocks. Accordingly, a cost (in terms of peak-signal to noise ratio (PSNR) and bit rate) of using each intra-prediction mode is determined and the intra-prediction mode with the minimum RDO cost is chosen as the principal intra-prediction mode for the pixel block. It is noted that the term 'principal' intra-prediction mode (for luma or chroma components) as used herein refers to the most preferred mode for performing the said intra-prediction for a pixel block. An RDO cost computation involves approximating the process flow 100 of FIG. 1 within the IPE device 204 and forecasting a bit rate (for example, bit rate obtained after entropy encoding) and a PSNR (obtained from reconstructed pixel block) that may be achieved upon utilization of a selected intra-prediction mode. In an embodiment, the cost computation module 206 is configured to compute the RDO costs for various suggested intra-prediction modes and provide the results to the comparison module 208. The comparison module 208 compares the RDO costs for various intra-prediction modes and provides an output to the decision module 210, which determines the principal intra-prediction mode (e.g. a mode with least RDO cost) based on the comparison of RDO costs.

In an embodiment, the cost computation module 206 is also configured to determine a partitioning cost of partitioning portions within a video picture. For example, the cost computation module 206 is configured to determine a partitioning cost of partitioning portions within a LCU into one or more configurations of prediction units (PUs). For example, a partitioning cost for each '4×4', '8×8', '16×16', '32×32' and '64×64' PUs is computed and compared (for example, by the comparison module 208) to enable the decision module 210 to determine the partitioning size for each LCU portion. For example, cost of partitioning a LCU portion into four '4×4' pixel blocks is computed and compared with a cost of partitioning the LCU portion into a '16×16' pixel block configured by the four '4×4' pixel blocks collectively. In an embodiment, the cost of partitioning the LCU portion into four '4×4' pixel blocks is computed by summing individual RDO costs associated with principal intra-prediction modes for each of the four '4×4' pixel blocks and a cost of encoding four intra-prediction modes associated with the four '4×4' pixel blocks. Similarly, the cost of partitioning the LCU portion into a 16×16' pixel block is computed by summing a RDO cost associated with principal intra-prediction mode of the '16×16' pixel block and a cost of encoding a single principal intra-prediction mode. The costs of partitioning the LCU portion in both cases are compared, for example by using the comparison module 208, and a PU size for partitioning the LCU portion is determined by the decision module 210 based on least cost criterion.

As explained above, the determination of intra-prediction mode for each pixel block is computationally intensive and needs to be reduced for efficiency purposes. It is noted that though the reduction in intra-prediction estimation computation is explained herein with reference to '64×64' pixel block size, the computation logic is applicable to other pixel block sizes, such as '8×8', '16×16' and '32×32' as well with requisite adjustments, such as disabling higher transform computations etc. Further, the reduction in intra-prediction estimation computation is explained with reference to the video coding standard HEVC. However, it is noted that embodiments as described herein are not limited to HEVC. In HEVC, the LCU is the base unit used for block-based coding. A picture is divided into non-overlapping LCUs. That is, an LCU plays a similar role in coding as the macro block of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be 4×4, 8×8, 16×16, and 32×32. The sizes of the transforms units and prediction units for a CU are determined by a video encoder during prediction based on minimization of rate/distortion costs. For simplicity of explanation, a 4:2:0 sampling rate is assumed in which for each 2×2 luma sample, there are two corresponding chroma samples. It is noted herein that luma and chroma blocks in a block of video data may be derived differently for intra-prediction.

In an embodiment, the IPE device 204 is configured to access four 'N×N' pixel blocks from the memory device 202. The four 'N×N' pixel blocks collectively configure a '2N×2N' pixel block of a video picture. In an embodiment, the four 'N×N' pixel blocks include luma related pixels. The pixel blocks including such luma specific information are hereinafter referred as luma blocks. In an embodiment, 'N' is an integer value from among one of 8, 16 and 32. The intra-prediction estimation as explained hereinafter is performed using a value of 'N' to be 32. Accordingly, the IPE device 204 accesses four '32×32' luma blocks configuring a '64×64' luma block of a video picture. However, it is noted that though the explanation for intra-prediction estimation for value of 'N' as 32 is applicable to values of 'N' as 8 or 16, requisite adjustments may need to be performed for ensuring applicability, such as disabling higher transform computations etc. Further, it is noted that intra-prediction estimation as explained herein assumes that prediction is performed at transform boundaries.

In an embodiment, the IPE device 204 is configured to access a first pre-determined number of candidate luma intra-prediction modes (hereinafter referred to as luma modes) for each of the four '32×32' pixel blocks by the IPE device 204. In an embodiment, a candidacy of a luma mode is determined based on a pre-defined measure. In an embodiment, the predefined measure is one of SAD cost and SATD cost. It is noted that the term 'candidate' intra-prediction modes (for both luma and chroma components) as used herein refers to those intra-prediction modes, which are most likely to be selected as a principal intra-prediction mode for a given pixel block. For example, if luma modes—3, 5 and 7—are accessed as candidate luma modes for a '32×32' luma block, then the principal luma mode for the '32×32' luma block is most likely to be one of 3, 5 and 7.

As explained with reference to FIG. 1, SAD (or SATD) cost computation is performed for each of the suggested 35 luma modes and a small set (e.g. pre-determined number) of candidate luma modes are selected from among the 35 luma modes based on minimization of SAD/SATD cost. In an embodiment, the cost computation module 206 is configured to perform SAD/SATD cost computation for the 35 luma modes for each '32×32' luma block. The comparison module 208 compares the SAD/SATD costs for the 35 luma modes and identifies a pre-determined number, for example three, luma modes from among the 35 luma modes for each of the four '32×32' pixel blocks based on least SAD costs. The identified three luma modes based on least SAD/SATD costs for each of the four '32×32' luma blocks are termed as the candidate luma modes for the corresponding '32×32' luma blocks. The cost computation module 206 is further configured to perform RDO cost computation for the three luma modes for each '32×32' luma block and identify the principal luma mode for each '32×32' luma block.

In an embodiment, the pre-determined number of candidate luma modes for '32×32' luma blocks are stored in the memory device 202 and are reused for determining the principal luma mode for '64×64' luma block. In an embodiment, the IPE device 204 receives the stored pre-determined number of candidate luma modes for each of the four '32×32' luma blocks.

In an embodiment, the IPE device 204 is configured to identify a presence of one or more luma modes that are common among the candidate luma modes of at least two of the four '32×32' pixel blocks. More specifically, the comparison module 208 of the IPE device 204 compares the candidate luma modes for the four '32×32' luma blocks and identifies one or more luma modes that are common to at least two of those four '32×32' luma blocks.

In an embodiment, the IPE device 204 is configured to select a principal luma mode for the '64×64' luma block from among the one or more luma modes upon identifying the presence of the one or more luma modes that are common among the candidate luma modes of at least two of the four '32×32' pixel blocks. In an embodiment, the IPE device 204 is configured to perform limiting a partitioning size to '32×32' luma block size for a portion of the video picture corresponding to the '64×64' luma block upon determining an absence of the one or more luma modes that are common to at least two of the four '32×32' pixel blocks. More specifically, if the comparison module 208 of the IPE device 204 determines that there are no common luma modes from among the candidate luma modes for the four '32×32' luma blocks, then the decision module 210 limits a LCU partitioning size to '32×32' luma block size for a portion of the video picture corresponding to the '64×64' luma block, thereby precluding the need to identify the principal luma mode for the '64×64' luma block and also the need to compute a cost of partitioning the luma block region into '64×64' luma block or into four '32×32' luma blocks.

In an embodiment, if a presence of a luma mode from among the one or more luma modes that is common to each of the four 'N×N' luma blocks is determined, then the luma mode is selected as the principal luma mode for the '2N×2N' luma block. For example, during the intra-prediction estimation for '64×64' luma block, the stored candidate luma modes for four '32×32' luma blocks (which configure the '64×64' luma block) are accessed and compared by the comparison module 208 to identify if any luma mode is common among the candidate luma modes for the four '32×32' luma blocks. If the comparison module 208 determines that there is a luma mode that is common to all of the four '32×32' luma blocks, then that luma mode is selected as the principal luma mode for the '64×64' luma block. As a result of re-using the candidate luma modes from four '32×32' luma blocks for intra-prediction estimation of '64×64' luma block, a SAD/SATD computation for 35 luma modes as well as RDO computation for candidate luma modes for identifying the principal luma mode for the '64×64' luma block can be skipped altogether, thereby enabling sizable saving in computational complexity.

In an embodiment if a presence of two or more luma modes that are common to each of the four 'N×N' pixel blocks is identified, then a luma mode is selected from among the two or more luma modes as the principal luma mode for the '2N×2N' pixel block based on RDO cost associated with each of the two or more luma modes. For example, if two intra-prediction modes—mode 5 and mode 11—are common among the three candidate luma modes for each of the four '32×32' luma blocks, then a RDO cost for modes 5 and 11 stored in the memory device 202 is retrieved, added for the four '32×32' luma blocks and compared to determine one luma mode from among modes 5 and 11 as the principal luma mode for the '64×64' luma block. Again, as a result of re-using the candidate luma modes and the corresponding RDO costs from four '32×32' luma blocks for intra-prediction estimation of '64×64' luma block, a SAD/SATD computation for 35 luma modes as well as RDO computation for candidate luma modes for identifying the principal luma mode for the '64×64' luma block can be skipped altogether, thereby enabling sizable saving in computational complexity.

In an embodiment, if the presence of the one or more luma modes that are common to two or three 'N×N' luma blocks from among the four 'N×N' luma blocks is determined by the IPE device 204, then the IPE device 204 is configured to associate the one or more luma modes with the remaining luma blocks from among the four 'N×N' luma blocks. For example, if two luma modes—mode 9 and mode 12—are common to only two of the four '32×32' luma blocks, then the modes 9 and 12 are associated with the remaining two of the four '32×32' luma blocks.

In an embodiment, the IPE device 204 is further configured to compute RDO cost for each of one or more luma modes for the remaining luma blocks, and, select a luma mode from among the one or more luma modes as the principal luma mode for the '2N×2N' luma block based on the RDO cost associated with each of the one or more luma modes. For example, upon associating luma modes 9 and 12 with the remaining luma blocks of the four '32×32' luma blocks (such that all four of the '32×32' luma block have 9 and 12 as the candidate luma mode), an RDO cost of 9 and 12 is computed for remaining '32×32' luma blocks and a luma mode with the least RDO cost from among 9 and 12 is chosen as the principal luma mode for the '64×64' luma block. As a result of re-using the candidate luma modes and the corresponding RDO costs from four '32×32' luma blocks for intra-prediction estimation of '64×64' luma block, a SAD/SATD computation for 35 luma modes as well as RDO computation for candidate luma modes for identifying the principal luma mode for the '64×64' luma block can be reduced sizably (as only ~1 to 2 RDO computations needs to be performed), thereby enabling sizable saving in computational complexity. The selection of the principal luma intra-prediction mode is further explained with reference to FIG. 3.

Figure 3:
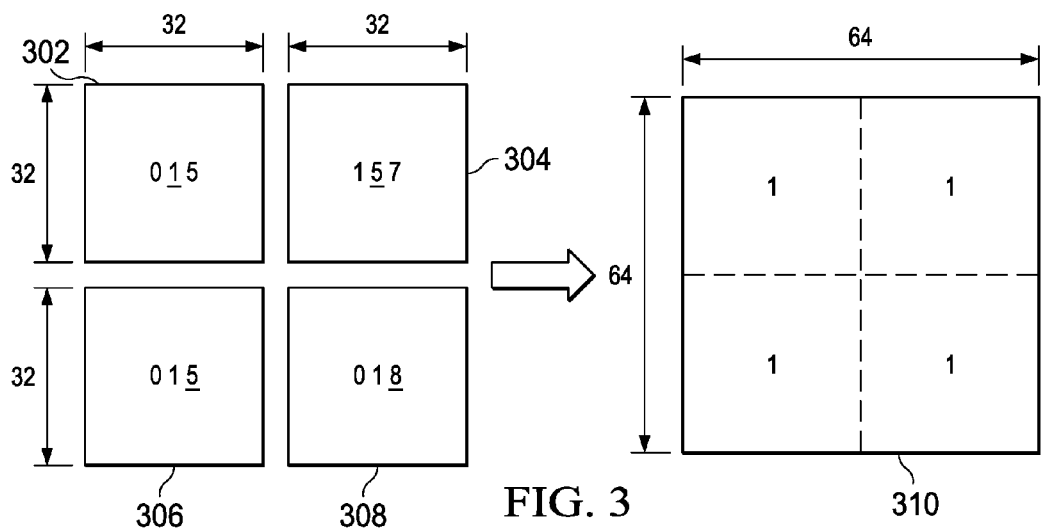
FIG. 3 depicts an exemplary visual representation of four '32×32' luma blocks for illustrating a selection of a principal luma intra-prediction mode for a '64×64' luma block in accordance with an embodiment.

FIG. 3 depicts an exemplary visual representation of four '32×32' luma blocks for illustrating selection of a principal luma mode for a '64×64' luma block in accordance with an embodiment. As explained with reference to FIG. 2, the IPE device 204 accesses four '32×32' luma blocks along with a pre-determined number of candidate luma modes for each of the four '32×32' luma blocks. One or more luma modes from among the candidate luma modes that are common to at least two of the four '32×32' blocks is identified and a principal luma mode selected from among the one or more luma modes. In FIG. 3, four '32×32' luma blocks, such as block 302, block 304, block 306 and block 308, which collectively configure a '64×64' luma block such as block 310, are accessed by the IPE device 204. Further, as explained with reference to FIG. 2, the candidate luma modes (based on SAD/SATD computation), associated RDO costs and reconstruction data for principal luma mode corresponding to the four '32×32' luma blocks 302-308, which were determined during intra-prediction estimation of each of the four '32×32' luma blocks 302-308 are stored in the memory device 202. During the intra-prediction estimation of block 310, the candidate luma modes for the four '32×32' luma blocks 302-308 are accessed from the memory device 202. The accessed candidate luma modes for blocks 302-308 are (0, 1, 5), (1, 5, 7), (0, 1, 5) and (0, 1, 8) respectively. In FIG. 3, the pre-determined number of candidate luma modes for each of the four '32×32' luma blocks is chosen to be three, however, it is noted that the pre-determined number of candidate luma modes may be greater or lesser than three. The principal luma modes based on RDO computation for the '32×32' luma blocks 302-308 are 1, 5, 5 and 8 respectively (depicted by underlined numerals in FIG. 3).

The comparison module 208 of FIG. 2 is configured to compare the accessed candidate luma modes and determine a presence of one or more luma modes that are common to at least two of the four '32×32' luma blocks. In FIG. 3, it is determined that luma mode '1' is common to all four of '32×32' luma blocks. Accordingly, luma mode '1' is selected as the principal luma mode for the '64×64' luma block 310. Estimation of the intra-prediction mode for '64×64' luma block in such a manner (e.g. by reusing candidate luma modes of '32×32' luma blocks) precludes the need to perform SAD and RDO computations for determining the principal luma mode for the '64×64' luma block, thereby leading to sizable resource and power saving.

In an embodiment, if it was determined that two or more of the three candidate luma modes are common to all four blocks 302-308, then a RDO cost associated with each of two or more luma modes are accessed from the memory device 202 and compared by the comparison module 208. The luma mode associated with the least RDO cost is selected as the principal luma mode for '64×64' luma block 310. For example, if luma modes 10 and 12 (not shown in FIG. 3) are common to all four luma blocks 302-308, then a RDO costs for luma modes 10 and 12 are accessed and compared with each other. The luma mode with the least RDO cost is selected as the principal luma mode for block 310. It is noted that the RDO cost for luma mode 10 may be computed by summing a RDO cost for mode 10 for each of the blocks 302-308. Similarly, the RDO cost for luma mode 12 may be computed by summing a RDO cost for mode 12 for each of the blocks 302-308.

As explained with reference to FIG. 2, if it is determined that one of more luma modes are common to two or three luma blocks from among the luma blocks 302-308, then the one or more luma modes are associated with the remaining luma blocks and a luma mode selected from among the one or more luma modes based on least RDO cost. For example, if luma modes 2 and 3 (not shown in FIG. 3) are common to blocks 302 and 304 only, then the luma modes 2 and 3 may be associated with the remaining luma blocks, e.g. blocks 306 and 308. A RDO cost for the luma modes 2 and 3 is computed for remaining blocks 306 and 308, such that RDO cost for luma modes 2 and 3 is now available for all four blocks 302-308. A RDO cost for luma modes 2 and 3 is then summed for all four blocks, respectively, and compared with each other. A principal luma mode is then selected from among luma modes 2 and 3 based on least RDO cost. It is noted herein that though determination of the principal luma mode involves some RDO computations, a number of RDO computations is drastically reduced as compared to conventional techniques of determining the principal luma mode by performing RDO computation for each of 35 luma intra-prediction modes.

In an embodiment, if it was determined that none of the luma modes from among the three candidate luma modes for blocks 302-308 are common, then the decision module 210 of FIG. 2 determines that computation of the principal luma mode for block 310 be avoided altogether and the block 310 be partitioned into PU size of '32×32' e.g. into blocks 302-308.

In an embodiment, upon determining the principal luma mode for block 310, a first partitioning cost associated with the block 310 (e.g. a '64×64' luma block) is computed based on the selected principal luma mode, e.g. mode '1'. Further, a second partitioning cost associated the four '32×32' luma blocks is computed and compared with the first partitioning cost. A partitioning size for a portion of the video picture corresponding to the '64×64' luma block is determined based on the comparison between the first partitioning cost and the second partitioning cost. More specifically, the partitioning size is chosen based on least partitioning cost from among the first partitioning cost and the second partitioning cost. As explained above, the principal luma modes for blocks 302-308 are 1, 5, 5 and 8 respectively. A RDO cost associated with each of these principal luma modes are obtained and summed with the cost of encoding/transmitting the luma modes (e.g. cost of transmitting modes 1, 5 and 8) to configure the second partitioning cost, e.g. the cost of partitioning the LCU in '32×32' PU size. Similarly, the RDO cost associated with principal luma mode '1' for block 310 is added to the cost of encoding/transmitting luma mode '1' to configure the first partitioning cost, e.g. the cost of partitioning the LCU in '64×64' PU size. Upon comparison of the first partitioning cost and the second partitioning cost, a partitioning size is chosen from among the two based on least cost.

In an embodiment, a pixel block adjacent (for example, right neighboring pixel block) to the '2N×2N' pixel block is configured to receive adjusted reconstructed data for performing luma intra-prediction estimation if it is determined that the first partitioning cost is less than the second partitioning cost, implying selecting a partitioning size for '2N×2N' pixel block to be '2N×2N'. The provisioning of the reconstructed data is explained as follows: As explained above, the IPE device 204 is configured to store reconstruction data corresponding to the principal luma mode in the memory device 202. In an embodiment, the reconstruction data corresponds to boundary pixel values that can be used by the adjacent luma block for intra-prediction estimation purposes. Accordingly, in FIG. 3, during intra-prediction estimation of four '32×32' luma blocks 302-308, the reconstruction data corresponding to principal luma modes 1, 5, 5 and 8 are stored in the memory device 202. It is noted that in some embodiments, reconstruction data corresponding to candidate luma modes (in addition to the principal luma mode) may be stored in the memory device 202. A subsequent intra-prediction estimation of '64×64' luma block 310 (configured of the four '32×32' luma blocks) may result in determination of mode "1" as the principal luma mode and a partitioning cost computation may result in the first partitioning cost being less than the second partitioning cost implying selection of luma block 310 as the PU block for the LCU. However, the reconstruction data for mode "1" may not be available for portions of the block 310 corresponding to blocks 304 and 308 (as reconstruction data corresponding to luma modes 5 and 8 is stored for these blocks and the intra-prediction estimation for block 310 may skip RDO computation for mode '1'). Accordingly, if it is determined that the LCU size is '64×64' than the reconstruction data used for intra-prediction estimation for an adjacent right block corresponds to modes '5' and '8' (i.e. adjusted reconstructed data) as opposed to principal luma mode '1' of '64×64' pixel block. On account of performing intra-prediction estimation for '64×64' luma block as explained with reference to FIGS. 2 and 3, left boundary reconstruction data for next adjoining block may or may not correspond to that of the principal luma mode if the LCU is a '64×64' luma block. Instead, stored values of principal luma modes for '32×32' luma blocks are used for intra-prediction estimation. Or in other words, if it is determined that the LCU size is '64×64', then the right neighboring block may receive the principal luma mode of the left neighboring block, which may or may not be the principal luma mode of '64×64' luma block and hence referred herein as adjusted reconstructed data. It is noted that that such utilization of adjusted reconstructed data does not have any sizable affect on a quality of intra-prediction.

In an embodiment, a determination of principal chroma mode is similarly performed as explained with reference to FIGS. 2 and 3. The determination of the principal chroma mode is further explained below.

Referring now to FIG. 2, the IPE device 204 is also configured to access four pixel blocks including chroma related pixels from the memory device 202. The four pixel blocks collectively configure a chroma pixel block (hereinafter referred to as chroma block) corresponding to the '2N×2N' pixel block. The chroma intra-prediction estimation as explained herein assumes an exemplary downsampling scheme of 4:2:0 adopted by the system 200. However, it is noted that any such downsampling scheme may be adopted by the system 200 and the downsampling scheme of 4:2:0 may not be considered limiting. Accordingly, a '2N× 2N' luma block is associated with two corresponding chroma blocks (for example, $C_b$ and $C_r$) of size 'N×N'. It is noted that the determination of principal chroma mode is explained herein with reference to one chroma component (either $C_b$ or $C_r$) and that such determination is applicable to the other chroma component. In an embodiment, the IPE device 204 accesses four 'N/2×N/2' chroma blocks configuring an 'N×N' chroma block corresponding to the '2N×2N' luma block of the video picture. For example, the IPE device 204 accesses four '16×16' chroma blocks configuring a '32×32' chroma block corresponding to a '64×64' luma block. It is noted that the intra-prediction estimation for chroma component is explained herein with reference to '32×32' chroma block, e.g. four '16×16' chroma blocks. However, different configurations of chroma blocks may be contemplated for chroma intra-prediction estimation with requisite adjustments (e.g. disabling of higher transforms etc.).

The IPE device 204 is further configured to access a second pre-determined number of candidate chroma inter-prediction modes (hereinafter referred to as chroma modes) for each of the four 'N/2×N/2' chroma blocks. In an embodiment, a candidacy of the chroma modes is determined based on a predefined measure. In an embodiment, the predefined measure is one a SAD cost and SATD cost. Video coding standards, such as HEVC suggest 5 intra-prediction modes for chroma intra-prediction purposes. Accordingly, the second pre-determined number of candidate chroma modes may be any number from 1 to 5. For example, in an embodiment, the pre-determined number of candidate chroma modes is chosen as three. Accordingly, the cost computation module 206 computes SAD/SATD costs for five chroma modes during intra-prediction estimation of each '16×16' chroma block. The comparison module 208 compares the SAD/SATD costs for the five chroma modes and determines a second pre-determined number (for example, three) candidate chroma modes from among the five chroma modes for each of the four '16×16' chroma blocks.

In an embodiment, the IPE device 204 is configured to identify a presence of one or more chroma modes that are common from among the candidate chroma intra-prediction modes of at least two of the four 'N/2×N/2' pixel blocks. More specifically, the comparison module 208 compares the candidate chroma modes of the four '16×16' chroma blocks and determines if any chroma mode is common to at least two of the four '16×16' chroma blocks.

In an embodiment, a presence of the principal luma mode for '2N×2N' luma block in the one or more chroma modes is identified by the IPE device 204 subsequent to identifying the presence of one or more chroma modes that are common among the candidate chroma modes. In an embodiment, the presence of principal luma mode is determined upon identifying the presence of one or more chroma modes to be present from among the candidate chroma modes. For example, if the principal luma mode for the '64×64' luma block is '1', then a presence of mode '1' is checked within the one or more chroma modes that are common among the candidate chroma intra-prediction modes of at least two of the four '16×16' chroma blocks.

In an embodiment, if the principal luma mode for '2N× 2N' luma block is determined to be present from among the one or more chroma modes, then the IPE device 204 is configured to select the principal chroma mode from among the one or more chroma intra-prediction modes based on RDO cost associated with each of the candidate chroma intra-prediction modes. In an embodiment, if the principal luma mode for the '2N×2N' luma block is determined to be absent from among the one or more chroma modes, then the IPE device 204 is configured to associate the principal luma mode with each of the four 'N/2×N/2' chroma blocks. The IPE device 204 is further configured to select the principal chroma mode from among the one or more chroma modes and the principal luma mode based on RDO cost associated with each of the one or more chroma modes and the principal luma mode. In an embodiment, a pixel block adjacent to the chroma pixel block is configured to receive adjusted reconstructed data for performing chroma intra-prediction estimation a pixel block size corresponding to the chroma pixel block is chosen as the partitioning size for a portion of the video picture corresponding to the chroma pixel block. The provisioning of the reconstructed data is performed as explained in conjunction with luma blocks and is not explained herein for sake of brevity. The selection of the principal chroma mode is further explained with reference to FIG. 4.

Figure 4:
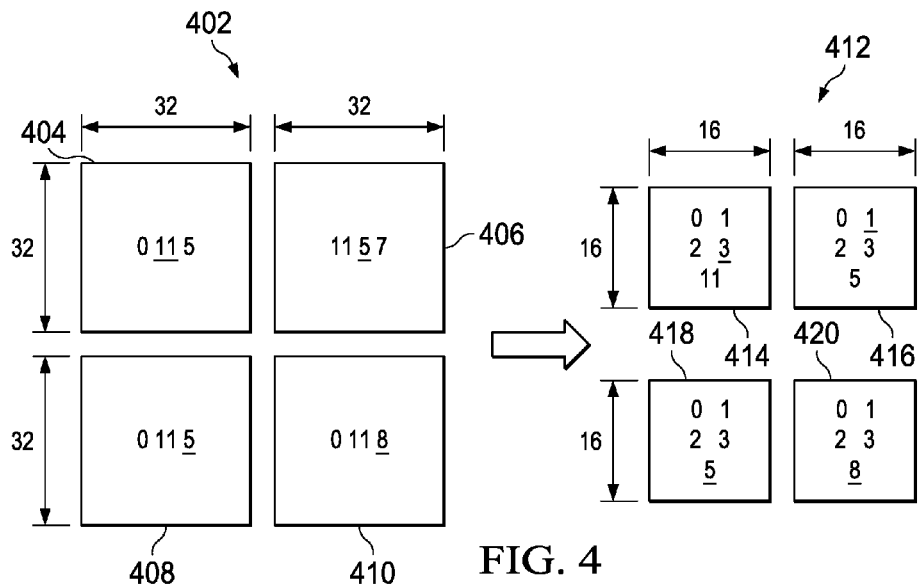
FIG. 4 depicts an exemplary visual representation of four '16×16' chroma blocks for illustrating a selection of a principal chroma intra-prediction mode for a '32×32' chroma block in accordance with an embodiment.

FIG. 4 depicts an exemplary visual representation of four '16×16' chroma blocks for illustrating selection of the principal chroma mode for a '32×32' chroma block in accordance with an embodiment. Video coding standards, such as the HEVC suggest five chroma intra-prediction modes for performing chroma intra-prediction.

As explained with reference to FIG. 2, the IPE device 204 receives four '16×16' chroma blocks along with a pre-determined number of candidate chroma modes for each of the four '16×16' chroma blocks. A presence of one or more chroma modes that are common among the candidate chroma modes of at least two of the four '16×16' chroma blocks is identified. A presence of the principal luma mode for '64×64' luma block (that corresponds to the '32×32' chroma block configured by the four '16×16' chroma blocks) is determined in the one or more chroma modes and the principal luma mode is considered during RDO computation for determining the principal chroma mode.

In FIG. 4, four '32×32' luma blocks 404, 406, 408 and 410 which configure a '64×64' luma block 402 are depicted. During the processing of luma blocks of PU size '32×32', a determination of principal luma modes may already be performed for blocks 404-410. In FIG. 4, the principal luma modes for blocks 404-410 are 11, 5, 5 and 8 (depicted by underlined numerals). This information is stored in the memory device 202. The principal luma mode for '64×64' luma block is determined to be 11 as explained with reference to FIGS. 2 and 3 and this information is also stored in the memory device 202.

FIG. 4 also depicts four '16×16' chroma blocks 414, 416, 418 and 420 configuring a '32×32' chroma block 412 corresponding to the '64×64' luma block 402. It is noted herein that eight '16×16' chroma blocks (corresponding to chroma $C_b$ and $C_r$ components) may be determined corresponding to the '64×64' luma block 402, however, chroma intra-prediction is explained herein with reference to only any one of the chroma components (e.g. four '16×16' chroma blocks). Each of four chroma blocks is associated with five chroma intra-prediction modes. Four of those modes correspond to DC, Vertical, Horizontal and Planar modes, which are 0, 1, 2 and 3 as depicted in FIG. 4. The fifth chroma intra-prediction mode is the principal luma mode from the corresponding luma block. Accordingly, the principal luma modes from corresponding '32×32' luma blocks 404, 406, 408 and 410 (e.g. 11, 5, 5 and 8 respectively) are associated with the blocks 414, 416, 418 and 420. Accordingly, the five chroma intra-prediction modes for blocks 414, 416, 418 and 420 are (0, 1, 2, 3, and 11), (0, 1, 2, 3, and 5), (0, 1, 2, 3, and 5) and (0, 1, 2, 3, and 8) respectively. A RDO cost computation is performed (for example, by the cost computation module 206 of FIG. 2) to determine the principal chroma mode for each of the four '16×16' chroma blocks during intra-prediction estimation for each of the four '16×16' chroma blocks. The principal chroma modes determined for the blocks 414, 416, 418 and 420 are 3, 1, 5, and 8 respectively (depicted as underlined numerals in FIG. 4).

The cost computation module 206 performs a SAD cost computation for each of the five chroma intra-prediction modes and identifies the top three candidate chroma modes with the least SAD cost during the intra-prediction estimation for four '16×16' chroma blocks. The top three candidate chroma modes for each of the four '16×16' chroma blocks are stored in the memory device 202 and later accessed during intra-prediction estimation of the '32×32' chroma block 412. It is noted that the pre-defined number three is chosen for illustration purposes and that the pre-defined number may be any number greater or smaller than three. Further it is noted that the pre-defined measure of candidacy, e.g. SAD cost, is mentioned herein for example purposes and any such measure, for example SATD cost and the like, may be utilized for identifying the top three candidate chroma modes.

In an embodiment, the comparison module 206 is configured to determine one or more chroma modes from among the candidate chroma modes that are common to at least two of the four '16×16' chroma blocks. In an embodiment, a presence of principal luma mode for '64×64' luma block from among the one or more chroma modes (for four '16×16' chroma blocks) is determined. If it is determined that the principal luma mode (for example '1') is present among the one or more chroma modes, then an RDO cost computation is performed for the one or more chroma modes to identify the principal chroma mode for the '32×32' chroma block 412. If it is determined that the principal luma mode for '64×64' luma block is not among the one or more chroma modes for the blocks 414, 416, 418 and 420, then the principal luma mode is associated with the each of the blocks 414, 416, 418 and 420 and a RDO cost computation is performed for the one or more chroma modes and principal luma mode to identify the principal chroma mode.

As explained, the system 200 may be included with a video processing device and may include components for performing various functions, which are not depicted herein. For example, the system 200 may additionally include components, such as an input unit (e.g., an image processing device), a video display unit (e.g., liquid crystals display (LCD), a cathode ray tube (CRT), and the like), a cursor control device (e.g., a mouse), a drive unit (e.g., a disk drive), a signal generation unit (e.g., a speaker) and/or a network interface unit. The input unit is configured to transfer the video pictures corresponding to a video data sequence to the memory device 202 in order to facilitate intra-prediction estimation of video pictures. The drive unit includes a machine-readable medium upon which is stored one or more sets of instructions (e.g., software) embodying one or more of the methodologies and/or functions described herein. In an embodiment, the software resides, either completely or partially, within the memory device 202, and/or within the IPE device 204 during the execution thereof by the system 200, such that the IPE device 204 and memory device 202 also constitute a machine-readable media. The software may further be transmitted and/or received over a network via the network interface unit.

The term "machine-readable medium" may be construed, for example, to include a single medium and/or multiple media (e.g., a centralized and/or distributed database, and/or associated caches and servers) that store the one or more sets of instructions. Moreover, the term "machine-readable medium" may be construed, for example, to include any medium that is capable of storing, encoding and/or carrying a set of instructions for execution by the system 200 and that cause the system 200 to perform any one or more of the methodologies of the various embodiments. Furthermore, the term "machine-readable medium" may be construed to include, but shall not be limited to, solid-state memories, optical and magnetic media, and carrier wave signals. The foregoing notwithstanding, it is noted that the present technology is not limited to any particular definition of "machine-readable medium". A method for luma intra-prediction estimation is explained with reference to FIGS. 5A and 5B.

Figure 5A:
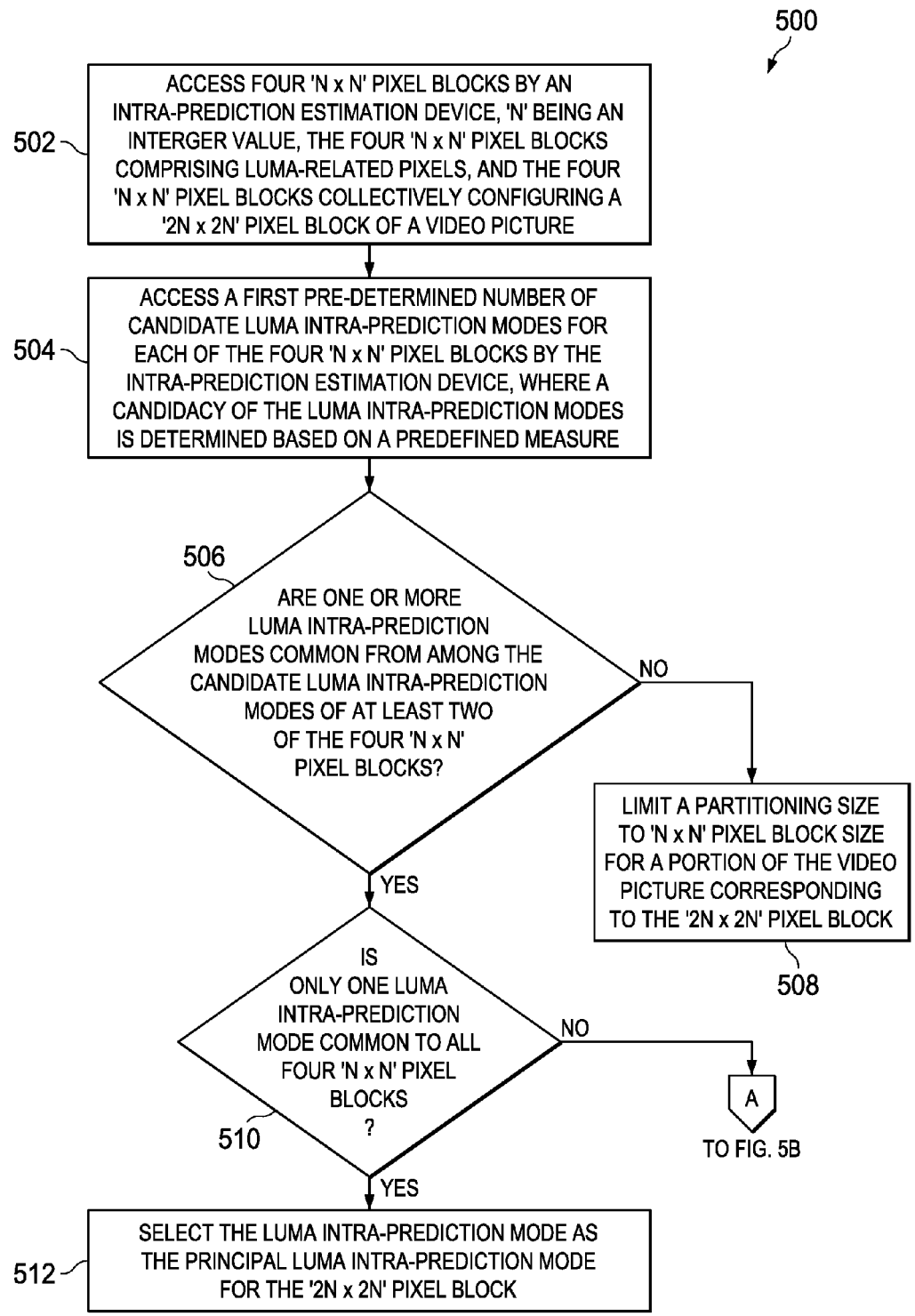
FIGS. 5A and 5B illustrate a flow diagram of an exemplary method of luma intra-prediction estimation in accordance with an embodiment.
Figure 5B:
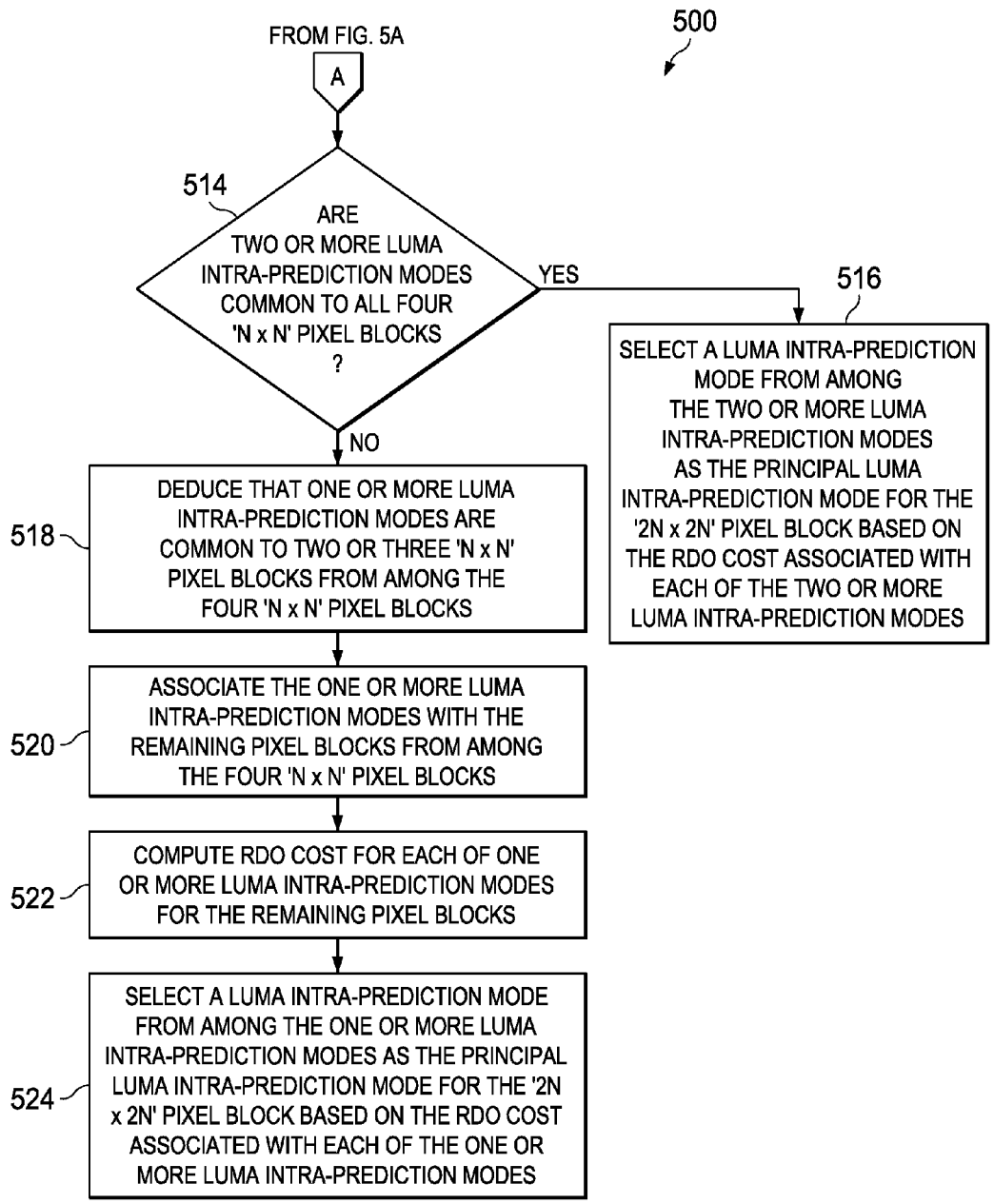

FIGS. 5A and 5B illustrate a flow diagram of an exemplary method 500 of luma intra-prediction estimation in accordance with an example embodiment. The method 500 depicted in the flow diagram may be executed by, for example, the system 200 explained with reference to FIG. 2. Operations of the flowchart, and combinations of operation in the flowchart, may be implemented by, for example, hardware, firmware, a processor, circuitry and/or a different device associated with the execution of software that includes one or more computer program instructions. The operations of the method 500 are described herein with help of the system 200. However, the operations of the method can be described and/or practiced by using a system other than the system 200. The method 500 starts at operation 502.

At operation 502, four 'N×N' pixel blocks are accessed by an intra-prediction estimation device, such as the IPE device 204 of FIG. 2. The four 'N×N' pixel blocks collectively configure a '2N×2N' pixel block of a video picture. In an embodiment, the four 'N×N' pixel blocks include luma related pixels. The pixel blocks including such luma specific information are referred as luma blocks. In an embodiment, 'N' is an integer value with value from one among 8, 16 and 32. For example, the intra-prediction estimation device accesses four '32×32' luma blocks configuring a '64×64' luma block.

At operation 504, a first pre-determined number of candidate luma intra-prediction modes (e.g. luma modes) for each of the four 'N×N' pixel blocks are accessed by the intra-prediction estimation device. In an embodiment, the candidacy of the luma intra-prediction modes is determined based on a predefined measure. In an embodiment, the predefined measure is one a SAD cost and a SATD cost. As explained with reference to FIGS. 2 and 3, during intra-prediction estimation of each 'N×N' luma block based on the HEVC standard, a SAD cost is computed for each of the 35 luma modes and a pre-determined number (for example, three) of candidate luma modes is selected based on the least SAD costs. The pre-determined number of candidate luma modes for each of the four 'N×N' pixel blocks are stored at a storage location (for example, memory device 202 of the system 200). The intra-prediction estimation device accesses the stored pre-determined number of candidate luma modes during intra-prediction estimation of '2N×2N' luma block.

At operation 506, a presence of one or more luma intra-prediction modes that are common from among the candidate luma intra-prediction modes of at least two of the four 'N×N' pixel blocks is determined by the intra-prediction estimation device. If it is determined that none of the luma intra-prediction modes are common to at least two of the four 'N×N' luma blocks then at operation 508, a partitioning size is limited to 'N×N' pixel block size for a portion of the video picture corresponding to the '2N×2N pixel block, thereby precluding the need to identify the principal luminance mode for the '2N×2N' luma block and also the need to compute a cost of partitioning the luma block region into '2N×2N' luma block or into four 'N×N' luma blocks.

Alternatively, if one or more luma modes that are common to at least two of the four 'N×N' pixel blocks is determined to be present, then at operation 510, it is determined if only one luma intra-prediction mode is common to all four 'N×N' pixel blocks. If it determined that only one luma intra-prediction mode is common to all four 'N×N' pixel blocks, then the common luma intra-prediction mode is selected as the principal luma intra-prediction mode for the '2N×2N' pixel block at operation 512. As a result of re-using the candidate luma modes from four 'N×N' luma blocks for intra-prediction estimation of '2N×2N' luma block, a SAD/SATD computation for 35 luma modes as well as RDO computation for candidate modes for identifying the principal luma mode for the '2N×2N' luma block can be skipped altogether, thereby enabling sizable saving in computational complexity.

If at operation 510, it is determined that more than one luma intra-prediction mode are common to all four 'N×N' pixel blocks, then at operation 514, it is determined if two or more luma intra-prediction modes are common to all four of the 'N×N' pixel blocks. If it is determined that two or more luma intra-prediction modes are common to all four of the 'N×N' pixel blocks, then at operation 516, a luma intra-prediction mode from among the two or more luma intra-prediction modes is selected as the principal luma intra-prediction mode for the '2N×2N' pixel block based on the RDO cost associated with each of the two or more luma intra-prediction modes. For example, if two intra-prediction modes—mode 5 and mode 11—are common among the three candidate luma modes for each of the four '32×32' luma blocks, then RDO costs for modes 5 and 11 stored in the memory device 202 are accessed, added for the four '32×32' luma blocks and compared to determine one luma mode from among mode 5 and 11 as the principal luma mode for the '64×64' luma block. Again, as a result of re-using the candidate luma modes and the corresponding RDO costs from four '32×32' luma blocks for intra-prediction estimation of '64×64' luma block, a SAD/SATD computation for 35 luma modes as well as RDO computation for candidate modes for identifying the principal luma mode for the '64×64' luma block can be skipped altogether, thereby enabling sizable saving in computational complexity.

If at operation 514, it is determined that two or more luma intra-prediction modes are not common to all four 'N×N' pixel blocks, then at operation 518, it is deduced that one or more luma intra-prediction modes are common to two or three 'N×N' pixel blocks from among the four 'N×N' pixel blocks. Accordingly, at operation 520, one or more luma intra-prediction modes are associated with the remaining pixel blocks from among the four 'N×N' pixel blocks. For example, if two luma modes—mode 9 and mode 12—are common to only two of the four '32×32' luma blocks, then the modes 9 and 12 are associated with the remaining two of the four '32×32' luma blocks. At operation 522, RDO cost is computed for each of one or more luma intra-prediction modes for the remaining pixel blocks. At operation 524, a luma intra-prediction mode from among the one or more luma intra-prediction modes is selected as the principal luma intra-prediction mode for the '2N×2N' pixel block based on the RDO cost associated with each of the one or more luma intra-prediction modes. For example, upon associating luma modes 9 and 12 with the remaining luma blocks of the four '32×32' luma blocks (such that all four of the '32×32 luma block have 9 and 12 as the candidate luma mode), an RDO cost of 9 and 12 is computed for all four '32×32' luma blocks and a luma mode with the least RDO cost from among 9 and 12 is chosen as the principal luma mode for the '64×64' luma block. As a result of re-using the candidate luma modes and the corresponding RDO costs from four '32×32' luma blocks for intra-prediction estimation of '64×64' luma block, a SAD/SATD computation for 35 luma modes as well as RDO computation for candidate modes for identifying the principal luma mode for the '64×64' luma block can be reduced sizably (as only ~1 to 2 RDO computations needs to be performed), thereby enabling sizable saving in computational complexity. A method of chroma intra-prediction estimation is explained with reference to FIGS. 6A and 6B.

Figure 6A:
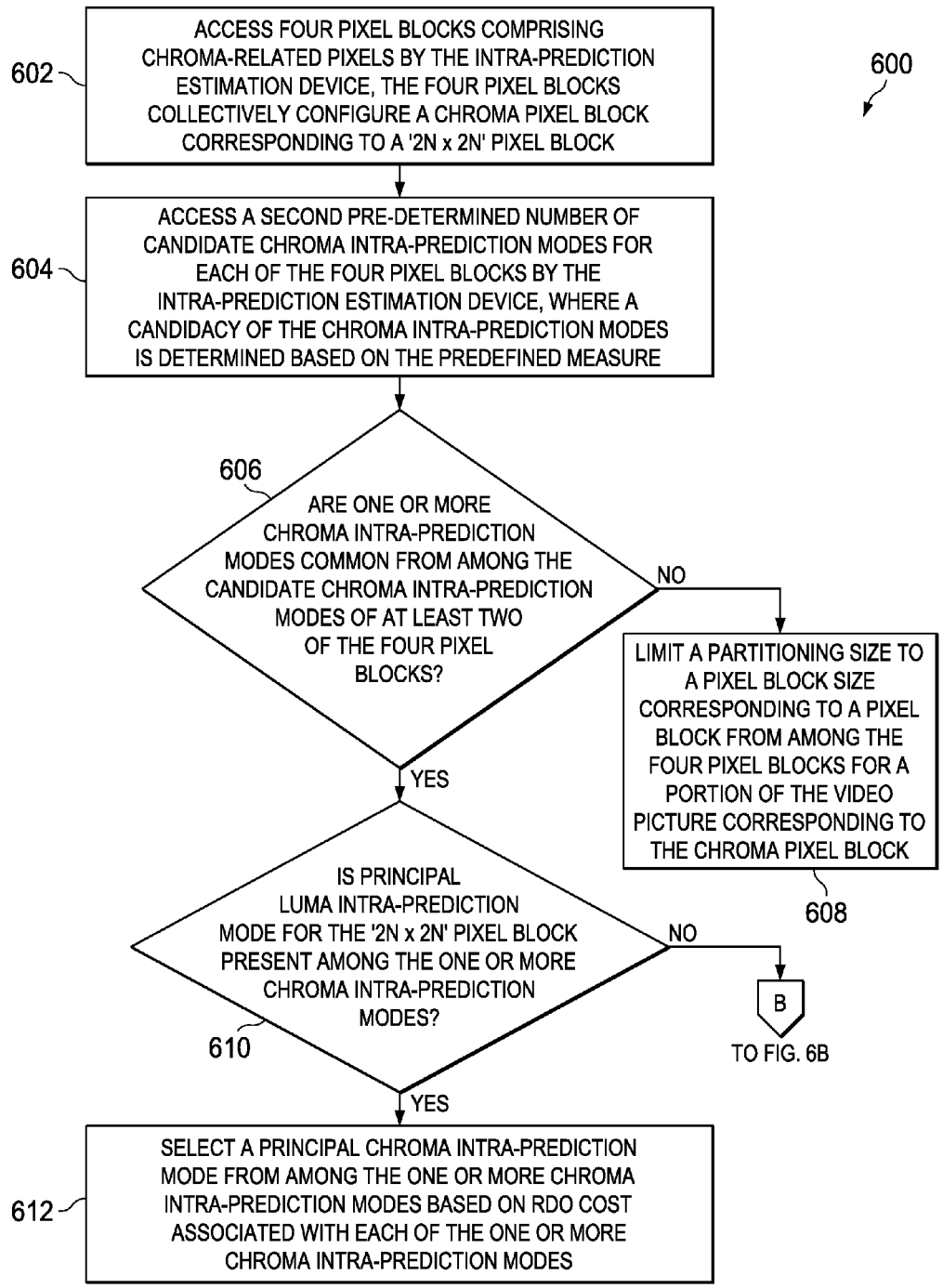
FIGS. 6A and 6B illustrate a flow diagram of an exemplary method of chroma intra-prediction estimation in accordance with an embodiment.
Figure 6B:
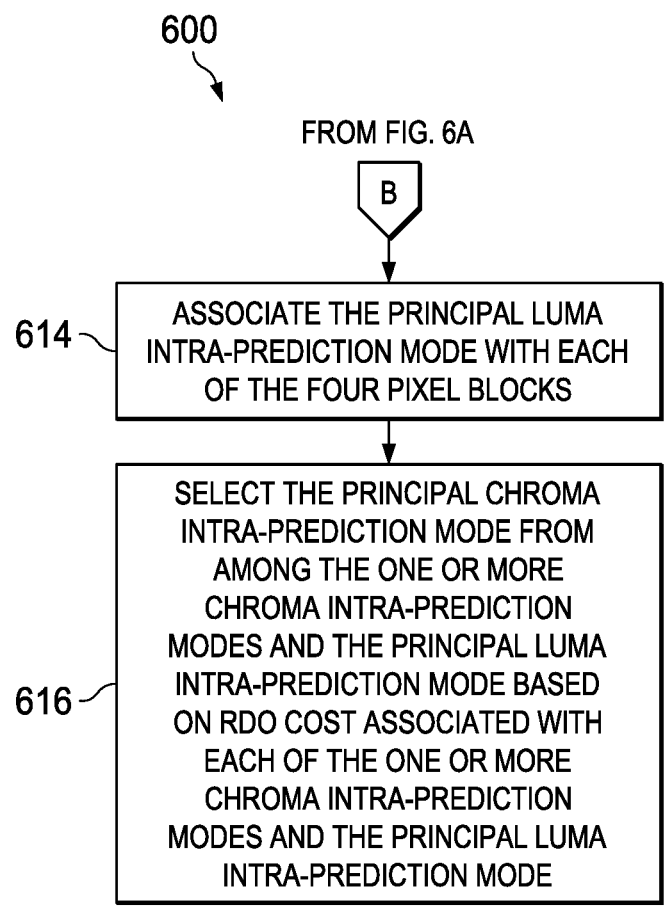

FIGS. 6A and 6B illustrate a flow diagram of an exemplary method 600 for chroma intra-prediction estimation in accordance with an embodiment. The method 600 depicted in the flow diagram may be executed by, for example, the system 200 explained with reference to FIG. 2. Operations of the flowchart, and combinations of operation in the flowchart, may be implemented by, for example, hardware, firmware, a processor, circuitry and/or a different device associated with the execution of software that includes one or more computer program instructions. The operations of the method 600 are described herein with help of the system 200. However, the operations of the method can be described and/or practiced by using a system other than the system 200. The method 600 starts at operation 602.

At operation 602, four pixel blocks including chroma related pixels are accessed by an intra-prediction estimation device, such as the IPE device 204 of FIG. 2. The four pixel blocks collectively configure a chroma pixel block (hereinafter referred to as chroma block) corresponding to the '2N×2N' pixel block. For example, the intra-prediction estimation device acceses four '16×16' chroma blocks configuring a '32×32' chroma block corresponding to a '64×64' luma block. It is noted that the method 600 is explained herein with reference to one chroma component (either $C_b$ or $C_r$) however, the method 600 is applicable to other chroma component as well.

At operation 604, a second pre-determined number of candidate chroma intra-prediction modes (e.g. chroma modes) for each of the four pixel blocks are accessed by the intra-prediction estimation device. In an embodiment, the candidacy of the chroma intra-prediction modes is determined based on a predefined measure. In an embodiment, the predefined measure is one a SAD cost and a SATD cost. As explained with reference to FIGS. 2 and 3, during intra-prediction estimation of each chroma block based on the HEVC standard, a SAD cost is computed for each of the five chroma modes and a pre-determined number (for example, three) of candidate chroma modes is selected based on the least SAD costs. The pre-determined number of candidate chroma modes for each of the four pixel blocks are stored at a storage location (for example, memory device 202 of the system 200). The intra-prediction estimation device accesses the stored second pre-determined number of candidate chroma modes during intra-prediction estimation of 'N×N' chroma block.

At operation 606, a presence of one or more chroma intra-prediction modes that are common from among the candidate chroma intra-prediction modes of at least two of the four pixel blocks is determined by the intra-prediction estimation device. If it is determined that none of the chroma intra-prediction modes are common to at least two of the four chroma blocks then at operation 608, a partitioning size is limited to a pixel block size corresponding to a pixel block from among the four pixel blocks for a portion of the video picture corresponding to the chroma pixel block, thereby precluding the need to identify the principal chroma mode for the 'N×N' chroma block and also the need to compute a cost of partitioning the chroma block region into 'N×N' chroma block or into four 'N/2×N/2' chroma blocks.

If it is determined at operation 606 that one or more chroma modes are common to at least two of the four chroma blocks, then operation 610 is performed. At operation 610, it is determined whether a principal luma intra-prediction mode (e.g. luma mode) for the '2N×2N' luma block (corresponding to the chroma pixel block) is present among the one or more chroma modes. If it is determined that the principal luma mode is present among the one or more chroma modes, then at operation 612, a principal chroma intra-prediction mode is selected from among the one or more chroma modes based on RDO cost associated with each of the one or more chroma modes.

If it determined at operation 610 that the principal luma mode is not present among the one or more chroma modes, then operation 614 is performed. At operation 614, the principal luma mode is associated with each of the four pixel blocks. At operation 616, the principal chroma intra-prediction mode is selected from among the one or more chroma modes and the principal luma mode based on RDO cost associated with each of the one or more chroma intra-prediction modes and the principal luma mode. An integrated circuit configured to facilitate intra-prediction estimation is explained with reference to FIG. 7.

Figure 7:
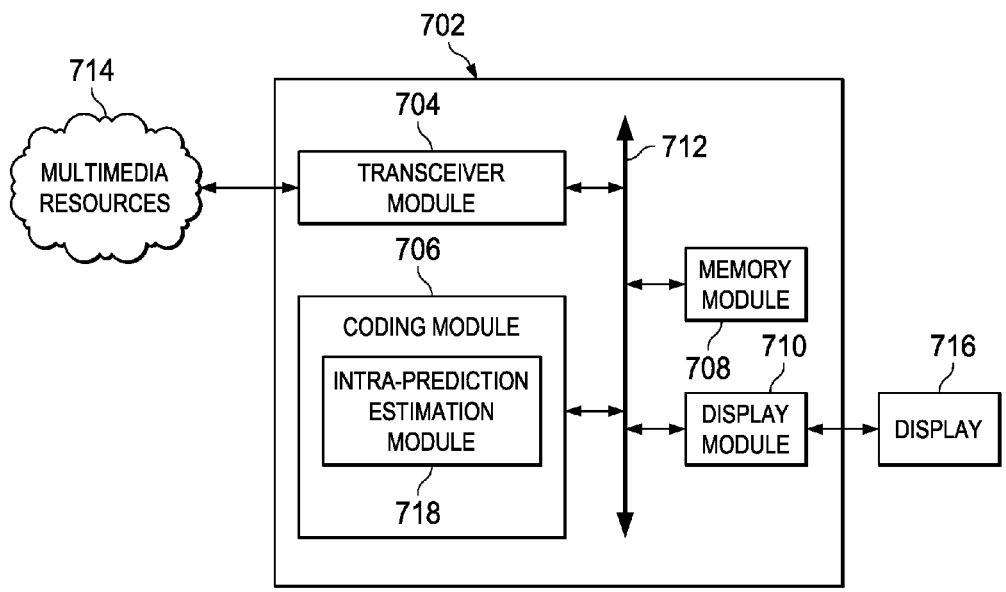
FIG. 7 is a block diagram of an exemplary integrated circuit configured to facilitate video picture intra-prediction estimation in accordance with an embodiment.

FIG. 7 is a block diagram of an exemplary integrated circuit 702 configured to facilitate video picture intra-prediction estimation in accordance with an embodiment. In an embodiment, the system 200 of FIG. 2 is embodied at least partially in the form of the integrated circuit 702. The integrated circuit 702 includes a transceiver module 704, a coding module 706, a memory module 708 and a display module 710. The transceiver module 704, the coding module 706, the memory module 708 and the display module 710 are communicatively associated or coupled with each other using data path 712. As such, it is noted that at least some of the components described below in connection with the integrated circuit 702 may be optional, and, thus, in an example embodiment the integrated circuit 702 includes more, less or different components than those described in connection with the example embodiment of FIG. 7. In an embodiment, the integrated circuit 702 may include only the coding module 706 and the memory module 708.

The transceiver module 704 is communicatively associated or coupled with a plurality of multimedia resources 714 and is configured to receive video pictures from one or more multimedia resources from among the plurality of multimedia resources 714. Examples of the multimedia resources include, but are not limited to (1) remote multimedia systems (2) media capture devices, such as, for example, a camera, camcorders and the like, and (3) multimedia storage devices, such as, for example, magnetic tapes, disks, computer-readable media, and the like. In an embodiment, the transceiver module 704 may include an antenna and/or network connectors configured to couple with or connect to wired networks (for example, local area networks (LANs)) and wireless networks (for example, cellular networks), or a combination thereof (for example, the Internet). Examples of network connectors may include a universal serial bus (USB) interface, a wireless LAN interface, an infrared interface, an Ethernet port, and the like.

The memory module 708 is configured to store the one or more video pictures. In an embodiment, the memory module 708 is substantially similar to the memory device 202 of system 200 of FIG. 2. The memory 708 is configured to perform functions as discussed in FIG. 2 with reference to memory device 202, which are not repeated herein for the sake of brevity. Examples of memory module 708 include, but are not limited to, RAM, dual port RAM, SDRAM, DDR SDRAM, and the like.

The coding module 706 is configured to perform at least one of encoding/decoding of video pictures using the intra-prediction estimation provided by the intra-prediction estimation module 718 included therein. In an embodiment, the coding module 706 is configured to perform one of encoding and decoding of video pictures and provide the encoded/decoded data to the transceiver module 704 for transmission purposes or to memory module 708 for storage purposes. In an embodiment, the intra-prediction estimation module 718 is substantially similar to the IPE device 204 of system 200 of FIG. 2. The intra-prediction estimation module 718 is configured to perform functions as discussed in FIG. 2, which are not repeated herein for the sake of brevity.

The display module 710 is configured to facilitate a display the one or more video pictures on display 716. The display 716 is facilitated, for example, in response to a user input received using a user interface (not shown in FIG. 7). Examples of display 716 include a liquid crystal display (LCD) panel, a plasma display panel, a field emission display and the like.

In an embodiment the integrated circuit 702 is an application processor chip. In an embodiment, the integrated circuit 702 is a part of a particular or shared processor chip that is embedded within a multimedia system. Examples of the multimedia system include, but are not limited to, (1) multimedia devices, such as, for example, cellular phones, digital video cameras and digital camcorders; (2) data processing devices, such as, for example, personal computers, laptops and personal digital assistants; and (3) consumer electronics, such as, for example, set top boxes, digital video disk (DVD) players and video network servers.

Without in any way limiting the scope, interpretation, or application of the claims appearing below, advantages of one or more of the example embodiments disclosed herein include facilitating intra-prediction estimation of video pictures with reduced computational complexity. Methods and systems disclosed herein suggest re-using of the candidate luma modes and associated RDO costs from four 'N×N' luma blocks for intra-prediction estimation of '2N×2N' luma block. Accordingly, a SAD/SATD computation for 35 luma modes as well as RDO computation for candidate modes for identifying the principal luma mode for the '2N×2N' luma block can be skipped altogether, thereby enabling sizable saving in computational complexity. In some scenarios wherein candidate luma modes are common among only two or three luma blocks, a SAD/SATD computation for 35 luma modes as well as RDO computation for candidate modes for identifying the principal luma mode for the '64×64' luma block can be reduced sizably (as only ~1 to 2 RDO computations need to be performed), thereby enabling sizable saving in computational complexity. The SAD/SATD costs as well as RDO cost for 'N/2×N/2' chroma blocks may be reused for chroma intra-prediction estimation of 'N×N' chroma block as well with minor additional RDO computation for 8 'N/2×N/2' chroma blocks (e.g. four each for each chroma component $C_b$ and $C_r$) thus reducing the number of computations required for determining the principal chroma intra-prediction mode.

Although the present technology has been described with reference to specific example embodiments, it is noted that various modifications and changes may be made to these embodiments without departing from the broad spirit and scope of the present technology. For example, the various devices, modules, analyzers, generators, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the various electrical structures and methods may be embodied using transistors, logic gates, and electrical circuits (for example, application specific integrated circuit (ASIC) circuitry and/or in Digital Signal Processor (DSP) circuitry).

Particularly, the system 200, the IPE device 204 and the memory device 202 may be enabled using software and/or using transistors, logic gates, and electrical circuits (for example, integrated circuit circuitry such as ASIC circuitry). Various embodiments of the present disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Also, techniques, devices, subsystems and methods described and illustrated in the various embodiments as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled with each other but may still be indirectly coupled and in communication, whether electrically, mechanically, or otherwise, with one another. Other examples of changes, substitutions, and alterations ascertainable by one skilled in the art, upon or subsequent to studying the example embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these example embodiments, it is noted that certain modifications, variations, and alternative constructions may be apparent and well within the spirit and scope of the technology. Although various example embodiments of the present technology are described herein in a language specific to structural features and/or methodological acts, the subject matter defined in the appended claims is not necessarily limited to the specific features or acts described above. Rather, the specific features and acts described above are disclosed as example forms of implementing the claims.

What is claimed is:

1. A method for video picture intra-prediction estimation, the method comprising:
   determining, with one or more processors, sets of M candidate prediction modes for 'N×N' pixel blocks included in a '2N×2N' pixel block based on a predefined measure, each of the sets of M candidate prediction modes being determined for a respective one of the 'N×N' pixel blocks;
   determining, with the one or more processors, whether any candidate prediction modes are common to all of the sets of M candidate prediction modes; and
   selecting one of a '2N×2N' partitioning size and an 'N×N' partitioning size for the '2N×2N' pixel block based on whether any candidate prediction modes in the sets of M candidate prediction modes are common to all of the sets of M candidate prediction modes.

2. The method of claim 1, wherein selecting the one of the 2N×2N' partitioning size and the 'N×N' partitioning size includes:
  selecting the '2N×2N' partitioning size for the '2N×2N' pixel block in response to determining that at least one of the candidate prediction modes in the sets of M candidate prediction modes is common to all of the sets of M candidate prediction modes; and
  selecting the 'N×N' partitioning size for the '2N×2N' pixel in response to determining that no candidate prediction mode in the sets of M candidate prediction modes is common to all of the sets of M candidate prediction modes.

3. The method of claim 1, wherein the predefined measure is a sum of absolute differences (SAD) cost.

4. The method of claim 1, wherein the predefined measure is a sum of absolute transform differences (SATD) cost.

5. The method of claim 1, wherein the candidate prediction modes are luma prediction modes.

6. The method of claim 1, wherein the candidate prediction modes are chroma prediction modes.

7. A system for video picture intra-prediction estimation, the system comprising:
  a memory device configured to store one or more video pictures;
  one or more processors coupled to the memory device and configured to:
    determine sets of M candidate prediction modes for 'N×N' pixel blocks included in a '2N×2N' pixel block based on a predefined measure, each of the sets of M candidate prediction modes being determined for a respective one of the 'N×N' pixel blocks;
    determine whether any candidate prediction modes in the sets of M candidate prediction modes are common to all of the sets of M candidate prediction modes; and
    select one of a '2N×2N' partitioning size and an 'N×N' partitioning size for the '2N×2N' pixel block based on whether any candidate prediction modes in the sets of M candidate prediction modes are common to all of the sets of M candidate prediction modes.

8. The system of claim 7, wherein the one or more processors are further configured to:
  select the '2N×2N' partitioning size for the '2N×2N' pixel block in response to determining that at least one of the candidate prediction modes in the sets of M candidate prediction modes is common to all of the sets of M candidate prediction modes; and
  select the 'N×N' partitioning size for the '2N×2N' pixel in response to determining that no candidate prediction mode in the sets of M candidate prediction modes is common to all of the sets of M candidate prediction modes.

9. The system of claim 7, wherein the predefined measure is a sum of absolute differences (SAD) cost.

10. The system of claim 7, wherein the predefined measure is a sum of absolute transform differences (SATD) cost.

11. The system of claim 7, wherein the candidate prediction modes are luma prediction modes.

12. The system of claim 7, wherein the candidate prediction modes are chroma prediction modes.

13. A non-transitory computer-readable medium comprising instructions that, when executed, cause one or more processors to:
  determine sets of M candidate prediction modes for 'N×N' pixel blocks included in a '2N×2N' pixel block based on a predefined measure, each of the sets of M candidate prediction modes being determined for a respective one of the 'N×N' pixel blocks;
  determine whether any candidate prediction modes in the sets of M candidate prediction modes are common to all of the sets of M candidate prediction modes; and
  select one of a '2N×2N' partitioning size and an 'N×N' partitioning size for the '2N×2N' pixel block based on whether any candidate prediction modes in the sets of M candidate prediction modes are common to all of the sets of M candidate prediction modes.

14. The non-transitory computer-readable medium of claim 13, wherein the instructions that cause the one or more processors to select one of the '2N×2N' partitioning size and the 'N×N' partitioning size include instructions that cause the one or more processors to:
  select the '2N×2N' partitioning size for the '2N×2N' pixel block in response to determining that at least one of the candidate prediction modes in the sets of M candidate prediction modes is common to all of the sets of M candidate prediction modes; and
  select the 'N×N' partitioning size for the '2N×2N' pixel in response to determining that no candidate prediction mode in the sets of M candidate prediction modes is common to all of the sets of M candidate prediction modes.

15. The non-transitory computer-readable medium of claim 13, wherein the predefined measure is a sum of absolute differences (SAD) cost.

16. The non-transitory computer-readable medium of claim 13, wherein the predefined measure is a sum of absolute transform differences (SATD) cost.

17. The non-transitory computer-readable medium of claim 13, wherein the candidate prediction modes are luma prediction modes.

18. The non-transitory computer-readable medium of claim 13, wherein the candidate prediction modes are chroma prediction modes.

* * * * *